Patented June 23, 1942

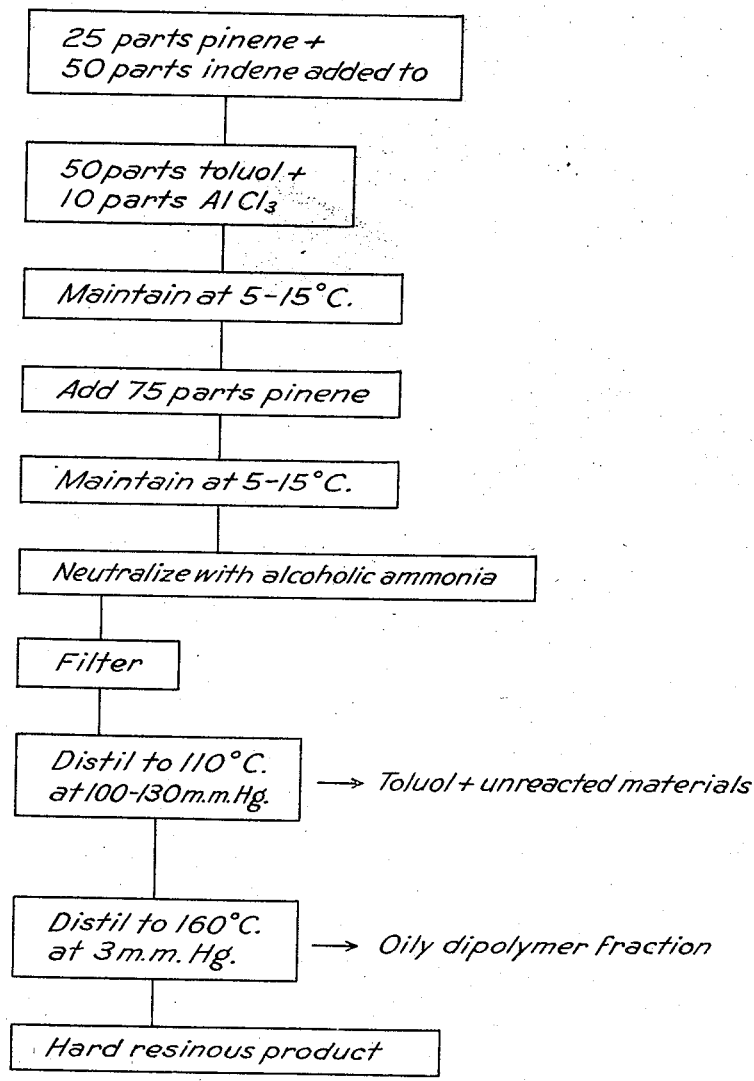

2,287,535

UNITED STATES PATENT OFFICE 2,287,535

COPOLYMERIZATION OF TERPENE HYDROCARBONS AND COAL TAR HYDROCARBONS

Paul O. Powers, Lancaster, Pa., assignor to Armstrong Cork Company, Lancaster, Pa., a corporation of Pennsylvania Application June 8, 1939, Serial No. 278,128

10 Claims. (Cl. 260—32)

This invention relates generally to a process of making hard resin and more particularly to such process wherein the resin is produced by the copolymerization of pinene and indene or coumarone. I may use turpentine as the material containing pinene and may use a coal tar fraction containing at least 5% unsaturated reactive material for supplying the indene and coumarone.

The turpentine obtained from the living tree is known as gum turpentine and contains about 65% alpha pinene $C_{10}H_{16}$ and 35% beta pinene. Wood turpentine, which is obtained from stump wood contains about 70% alpha pinene, very little beta pinene and varying amounts of dipentene and other terpenes.

Most attempts to polymerize turpentine or terpenes have led to the formation of the dipolymer, an oily high boiling liquid which dries slowly but has never found any great use. By improved methods it has been possible to produce a hard brittle resin which is of use as a varnish resin or in tile binders. The resin is hard and can be produced with excellent color. However, it is a low molecular weight resin and is quite soluble in mineral and other oils. I have found that by copolymerizing turpentine or other source of pinene with indene or coumarone or with indene and coumarone the molecular weight of the resin so produced is increased as compared to that produced by the polymerization of turpentine alone. Furthermore, the solubility of the copolymerized resin is much less, which is an advantage in some cases.

The invention will be described more particularly as applied to the production of resin from pinene and indene, it being understood that coumarone may be used to replace a part or all of the indene.

I have found that in the copolymerization of pinene and indene the best resins are obtained by using low reaction temperatures. The reaction temperatures which I prefer to employ are between 5 and 30° C. Higher temperatures tend to produce resins of lower molecular weight and greater solubility in mineral oils, as well as producing resins of darker color.

The reaction is conducted in the presence of aluminum chloride as a catalyst and I have found that it is essential to employ with this catalyst a liquid hydrocarbon which acts as a reaction promoting dispersing or dissolving agent. These dispersing agents may be hydrocarbons or chlorinated hydrocarbons. Although toluol is the preferred liquid hydrocarbon, I may use benzene, chloroform, carbon tetrachloride or other suitable material. I have found that in the absence of a liquid hydrocarbon solvent or dispersing agent the polymers formed are chiefly dipolymers which are oily high boiling liquids instead of the hard resin which is desired. The dispersing agent apparently serves the function of rendering the aluminum chloride more soluble, possibly due to the formation of a complex, thus insuring better contact between catalyst and unsaturates. In addition, it serves as a solvent or dispersing agent for the resin as it is formed during polymerization, thereby eliminating difficulties in handling.

I have found that I may increase the molecular weight of the resin and decrease its solubility in mineral and other oils by controlling the relative amount of pinene or turpentine on the one hand and the amount of indene or coumarone on the other hand during the early stages of the polymerizing reaction. I have found that during the early stage of the reaction the mixture of pinene and indene, for example, should contain a relatively small amount of pinene and a relatively large amount of indene, in order to produce the high molecular weight and relatively insoluble resin. For example, I have produced resin by using 100 parts by weight of turpentine and 50 parts of indene. Ten parts of aluminum chloride were used as catalyst and the reaction promoting dispersing agent employed for this catalyst was 50 parts of toluol. In one case, a solution was made containing ¼ of the turpentine (25 grams) and all of the indene (50 grams). This solution was added gradually with stirring to the dispersion of aluminum chloride in toluol. Thereafter the balance of the turpentine (75 grams) was gradually added. In the second case, the same total amounts of the same ingredients were used; but all of the indene (50 grams) and all of the turpentine (100 grams) were mixed and this solution was then added slowly to the reaction flask containing the toluol and aluminum chloride. The only difference in the two batches was that in the first batch the reaction mixture contained a relatively small amount of turpentine during the early stage of the reaction, whereas the second batch contained a relatively large proportion of turpentine during the early stage of the reaction. The yield of hard resin was approximately the same in each case but it was found that the resin from the first batch was much less soluble than that from the second batch.

The solubility of these resins in a mineral oil was measured by determining their cloud points. In determining the cloud point, the resin was mixed with the mineral oil in the proportion of 50% resin and 50% mineral oil. The mixture was then heated to a temperature necessary to dissolve the resin in the oil and the solution was allowed to cool slowly. The temperature at which the solution begins to cloud due to the resin coming out of solution is noted as the cloud point. The cloud point of the resin from the first batch above referred to was 125° C., whereas the resin from the second batch had a cloud point below 25° C. Since the only difference in producing the two resins was in the relative proportions of the turpentine and indene during the early stage of the reaction, it is apparent that it was this factor which determined the relative solubility of the two products. In the first stage of the reaction, at least 50% of the reactive materials must be coumarone or indene and as much as 90% of the reactive materials may be coumarone or indene. Thus the amount of turpentine or pinene present may vary from 10% to 50% by weight of the reactive materials. Normally, turpentine comprises about ⅓ of the reactive materials. The solubility of the resin will decrease and the molecular weight will increase as the proportion of the coumarone or indene, is increased in the initial stage of the reaction. In the claims where reference is made to "a relatively small amount" of pinene or turpentine or terpene hydrocarbons of the $C_{10}H_{16}$ series, it is meant that these materials constitute ½ or less by weight of the reactive mixture.

It was found that it made no substantial difference in the results obtained whether the pinene and indene were added to the aluminum chloride and toluene or whether the aluminum chloride and toluene were added to the pinene and indene. In any case, it is advisable to add one material to the other slowly, since there is great difficulty in controlling the temperature of reaction, if the materials are all mixed at one time.

The following are specific examples of the invention, it being understood that the examples are given merely for illustrative purposes:

*Example I*

100 parts by weight of pinene, 50 parts of indene, 50 parts of toluol and 10 parts of anhydrous aluminum chloride were reacted at a temperature between 5 and 15° C. During the first stage of the reaction, about ¼ of the pinene was mixed with all of the indene and this solution was gradually added with stirring to the toluol and aluminum chloride. Thereafter the remainder of the pinene was gradually added to the reaction mixture and the mixture maintained at a temperature of 5° to 15° C. At the conclusion of the reaction, the aluminum chloride was neutralized with alcoholic ammonia prepared by adding denatured alcohol to CP concentrated ammonium hydroxide. The batch was filtered and separated into its various fractions by vacuum distillation. Distillation to 110° C. at 100–130 mm. removes the toluol and the unreacted materials. Distillation to 160° C. at 3 mm. removes the oily dipolymer fraction. The residue from this distillation was the hard resinous product.

A flow sheet illustrating Example I is given in the accompanying drawing.

*Example II*

Two parts of technical aluminum chloride were added at 10° to 30° C. to a mixture containing 150 parts indene fraction (35% indene), 100 parts chloroform and 20 parts of turpentine. Then 155 parts of turpentine were added at the same temperature. Then eight parts of aluminum chloride were added at the same temperature. The reaction mass was then neutralized, filtered and evaporated as in the previous examples.

*Example III*

In this case, the procedure was the same as that of Example II, except a coumarone fraction containing 25% coumarone was used instead of the indene fraction.

*Example IV*

Ten parts of aluminum chloride were added at 10° to 15° C. to a mixture containing 50 parts indene fraction (30% indene), 50 parts of benzene and 15 parts of turpentine. Then 160 parts of turpentine were added and thereafter the reaction mass was neutralized, filtered and distilled.

*Example V*

Two parts of aluminum chloride were added at 10° to 30° C. to a mixture containing 100 parts indene fraction, (30% indene), 50 parts toluol and 25 parts of turpentine. Then 150 parts of turpentine and 8 part of aluminum chloride were added at the same temperature. After reaction, the mass was neutralized, filtered and distilled.

In place of alpha or beta pinene or turpentine, I may use other terpene hydrocarbons of the $C_{10}H_{16}$ series, such as dipentine, linonene, terpinene, terpinolene and similar materials, all of which function in a manner similar to pinene and are satisfactory for some purposes, although the yields obtained are not always as high as obtained with pinenes.

In using coal tar fractions which contain non-reactive hydrocarbons in addition to the indenes or coumarones, it may in some cases be satisfactory to permit the non-reactive material to remain with the reacted mixture. In such cases, the reacted mixture is neutralized and filtered as described but it is not distilled in order to produce the hard resin. The undistilled reacted mixture is useful as a cold cut for varnish makers.

If coal tar fractions containing indene or coumarone are treated with aluminum chloride but no turpentine or pinene is present in the reaction mass, soft oily materials are formed by the interaction of indene or coumarone with the methyl benzenes present in these coal tar fractions. The yield of hard resin is small and the resin is rather soluble. This illustrates the advantage of copolymerizing the coal tar fraction with the turpentine or pinene in accordance with the present invention.

The invention is not limited to the specific examples or the preferred proportions referred to but may be otherwise embodied or practiced within the scope of the following claims.

I claim:

1. The process which comprises mixing a coal tar fraction containing at least five per cent of unsaturated aromatic reactive material including coumarone and indene with a relatively small amount of terpene hydrocarbons of the $C_{10}H_{16}$ series as compared with the amount of unsaturated aromatic reactive material, reacting the mixture in the presence of aluminum chloride and a dispersing agent selected from the group consisting of benzene, toluene, chloroform, and carbon tetrachloride, thereafter adding a further quantity of terpene hydrocarbons and continuing the reaction, and neutralizing the reaction product.

2. The process of making hard thermoplastic resin which comprises mixing a coal tar fraction containing at least five per cent of unsaturated aromatic reactive material including coumarone and indene with a relatively small amount of terpene hydrocarbons of the $C_{10}H_{16}$ series as compared with the amount of unsaturated aromatic reactive material, reacting the mixture in the presence of aluminum chloride and a dispersing agent selected from the group consisting of benzene, toluene, chloroform, and carbon tetrachloride, thereafter adding a further quantity of terpene hydrocarbons and continuing the reaction, neutralizing the reaction product and distilling off the dispersing agent, unreacted material, and oily fraction.

3. The process which comprises mixing at least one member of the group consisting of coumarone and indene with a relatively small amount of terpene hydrocarbons of the $C_{10}H_{16}$ series as compared with the amount of said first mentioned member, reacting the mixture in the presence of aluminum chloride and a dispersing agent selected from the group consisting of benzene, toluene, chloroform, and carbon tetrachloride, thereafter adding a further quantity of terpene hydrocarbons and continuing the reaction, and neutralizing the reaction product.

4. The process of making hard thermoplastic resin, which comprises mixing at least one member of the group consisting of coumarone and indene with a relatively small amount of terpene hydrocarbons of the $C_{10}H_{16}$ series as compared with the amount of said first mentioned member, reacting the mixture in the presence of aluminum chloride and a dispersing agent selected from the group consisting of benzene, toluene, chloroform, and carbon tetrachloride, thereafter adding a further quantity of terpene hydrocarbons and continuing the reaction, neutralizing the reaction product, and distilling off the dispersing agent, unreacted material, and oily fraction.

5. The process which comprises mixing at least one member of the group consisting of coumarone and indene with a relatively small amount of pinene as compared with the amount of said first mentioned member, reacting the mixture in the presence of aluminum chloride and a dispersing agent selected from the group consisting of benzene, toluene, chloroform, and carbon tetrachloride, thereafter adding a further quantity of pinene and continuing the reaction, and neutralizing the reaction product.

6. The process of making hard thermoplastic resin, which comprises mixing at least one member of the group consisting of coumarone and indene with a relatively small amount of pinene as compared with the amount of said first mentioned member, reacting the mixture in the presence of aluminum chloride and a dispersing agent selected from the group consisting of benzene, toluene, chloroform, and carbon tetrachloride, thereafter adding a further quantity of pinene and continuing the reaction, neutralizing the reaction product and distilling off the dispersing agent, unreacted material, and oily fraction.

7. In the process of making hard thermoplastic resin by the copolymerization of pinene and at lease one member of the group consisting of coumarone and indene by reacting a mixture of said materials in the presence of aluminum chloride and a dispersing agent selected from the group consisting of benzene, toluene, chloroform, and carbon tetrachloride, the steps which comprise employing during the early stage of the reaction a mixture containing substantially less pinene as compared with the other material to be copolymerized therewith, subsequently adding more pinene and continuing the reaction.

8. The process of making hard thermoplastic resin, comprising reacting at least one member of the group consisting of coumarone and indene with a relatively small amount of pinene as compared with the amount of said first mentioned member in the presence of aluminum chloride and a dispersing agent selected from the group consisting of benzene, toluene, chloroform, and carbon tetrachloride, the reaction being carried out at a temperature of about 5° C. to about 30° C., thereafter adding a further quantity of pinene and continuing the reaction, neutralizing the reaction product, and distilling off the dispersing agent, unreacted material, and oily fraction.

9. A resin resulting from the reaction of a mixture of a terpene hydrocarbon and at least one member of the group consisting of coumarone and indene in the presence of aluminum chloride and a dispersing agent selected from the group consisting of benzene, toluene, chloroform, and carbon tetrachloride at a temperature of about 5° C. to 30° C., said terpene being present in a relatively small amount as compared with the amount of said first mentioned member during the initial stage of the reaction, and additional terpene being added gradually as the reaction proceeds.

10. A resin resulting from the reaction of a mixture of pinene and at least one member of the group consisting of coumarone and indene in the presence of aluminum chloride and a dispersing agent selected from the group consisting of benzene, toluene, chloroform, and carbon tetrachloride at a temperature of about 5° C. to 30° C., said pinene being present in a relatively small amount as compared with the amount of said first mentioned member during the initial stage of the reaction, and additional pinene being added gradually as the reaction proceeds.

PAUL O. POWERS.